Oct. 19, 1948.         J. R. ROEBUCK              2,451,873
                PROCESS AND APPARATUS FOR HEATING
                     BY CENTRIFUGAL COMPRESSION
Filed April 30, 1946                          2 Sheets-Sheet 2
Fig. 6.
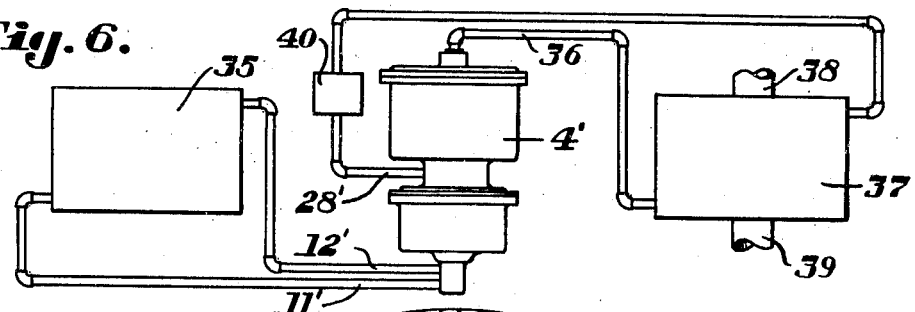
Fig. 3.
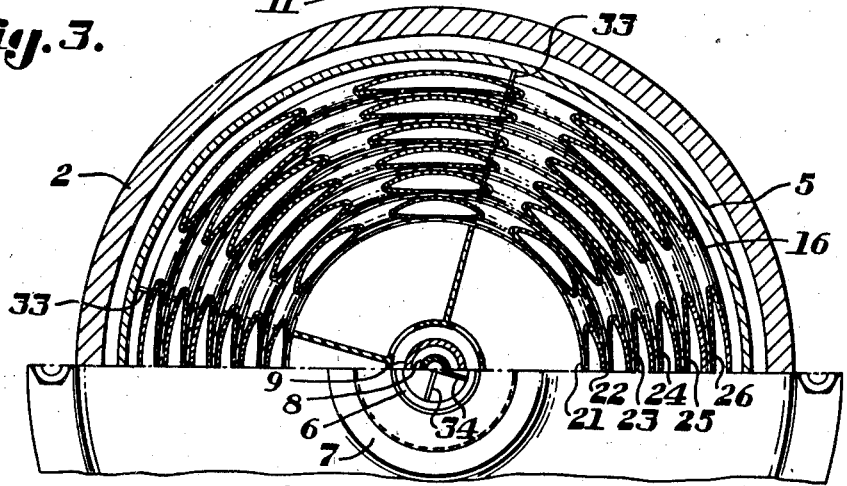
Fig. 4.
Fig. 5.
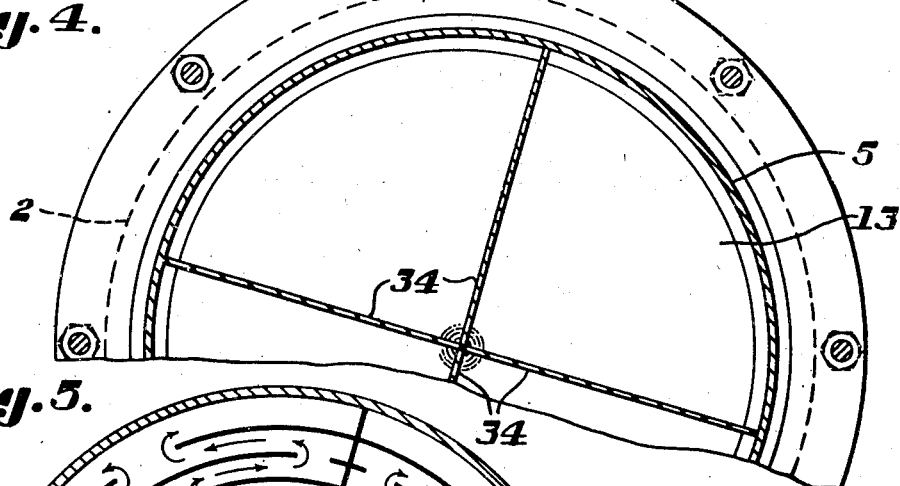
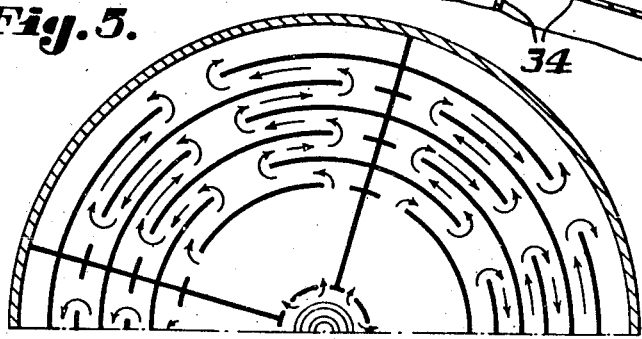
INVENTOR
JOHN R. ROEBUCK Patented Oct. 19, 1948

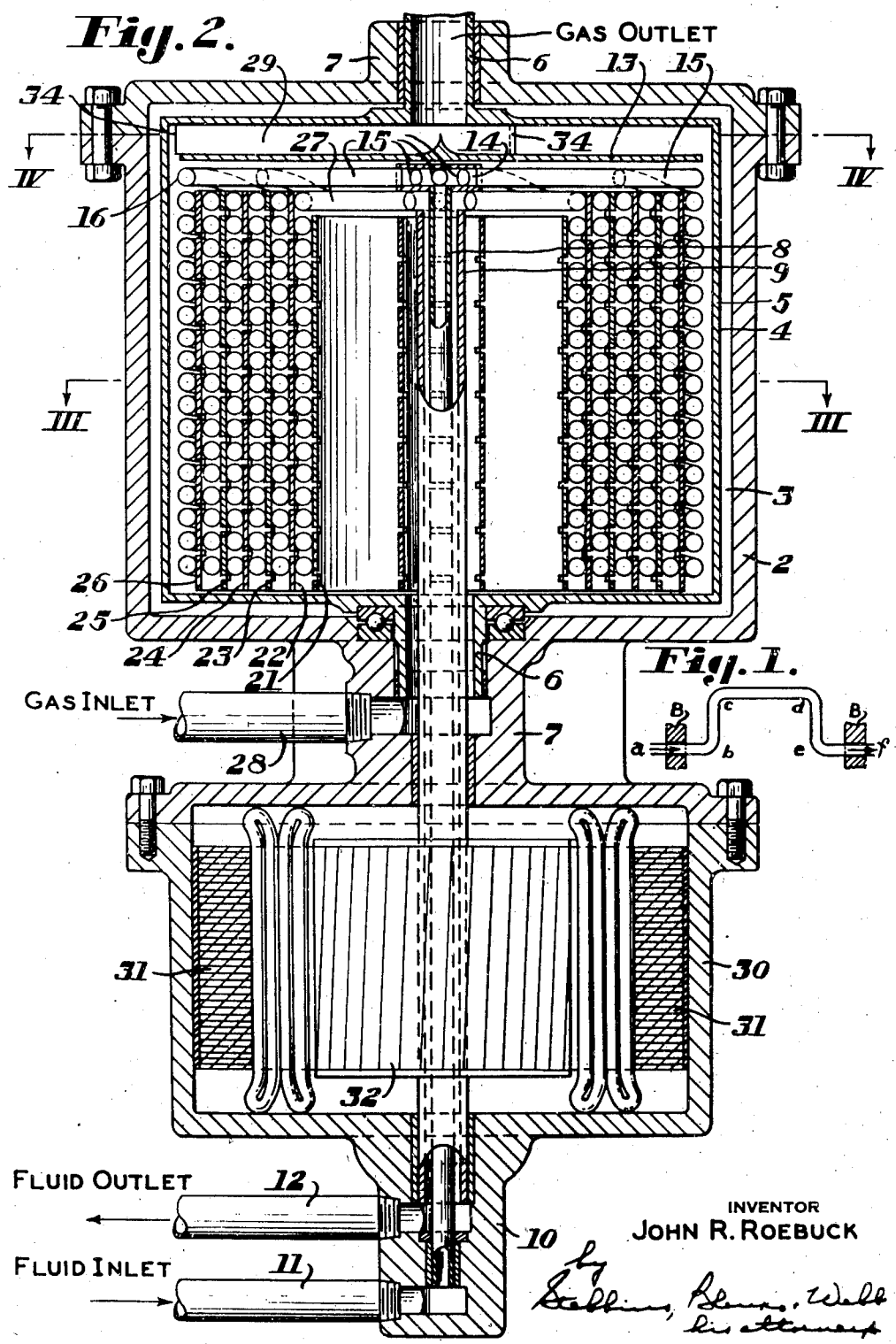

2,451,873

UNITED STATES PATENT OFFICE 2,451,873

PROCESS AND APPARATUS FOR HEATING BY CENTRIFUGAL COMPRESSION

John R. Roebuck, Madison, Wis.

Application April 30, 1946, Serial No. 666,040

8 Claims. (Cl. 62—170)

This invention relates to a heating process and apparatus and more particularly to a process and apparatus for heating similar to the thermodynamic process and apparatus of my Patent No. 2,393,338. My said patent discloses a process and apparatus wherein work is transformed into heat energy or vice versa. Such process and apparatus effect heat transfer at high efficiency and consequently at low cost.

The invention will be described as embodied in a heating process and apparatus in which a flowing gas is subjected to centrifugal action and thereby compressed and while it is being compressed is in thermoconductive relationship with a thermoconductive substance which extracts heat from the gas. The thermoconductive substance, which is preferably a liquid and may, for example, be water (although alcohol or other light mobile fluid may be employed), and is heated by the gas being compressed, is conducted through heat transfer means whereby the thermoconductive substance acts as a heating medium.

The thermoconductive substance is preferably brought into thermoconductive relationship with the gas only after the gas has been subjected to an initial compression which raises its temperature sufficiently that it will heat the thermoconductive substance to the desired temperature so that the latter may act as a heating medium. The gas may, for example, be air (although other gases, such, for example, as argon, neon, helium, etc., may be employed) and my invention is well adapted for embodiment in a domestic heating system for homes and other buildings.

Desirably the gas, which for example may be considered to be air, is initially compressed adiabatically until a desired elevated temperature is obtained. The thermoconductive substance, which for example may be considered to be water, is then brought into thermoconductive relationship with the heated gas whereby the thermoconductive substance is heated to the desired temperature for use as a heating medium. For most efficient results the compression of the gas after the point at which the thermoconductive substance is brought into thermoconductive relationship therewith should be substantially isotheraml; however, attainment of that condition in actual practice is virtually impossible. It is, nevertheless, desirable to approach isothermal compression during the second compression stage of the gas after the initial adiabatic compression.

The apparatus which I prefer to use is similar to the apparatus of my said patent. I have found that the coil for the thermoconductive substance should not, when the apparatus is used as a heater, extend in substantially to the axis of the rotor as disclosed in my said patent but should terminate at a point substantially removed from the axis of the rotor. This provides for adiabatic compression of the gas before it gives up heat to the thermoconductive substance. Thus I preferably deliberately refrain from bringing the thermoconductive substance into thermoconductive relationship with the gas until the gas has been subjected to an initial compression which raises its temperature sufficiently that it imparts to the thermoconductive substance sufficient heat to provide for employment of that substance as a heating medium.

Other details, objects and advantages of the invention will become apparent as the following description of certain present preferred embodiments of the invention and certain present preferred methods of practicing the same proceeds.

In the accompanying drawings I have shown a present preferred embodiment of the invention and have illustrated a present preferred method of practicing the same, in which Figure 1 is a diagram to aid in explaining the principle of operation;

Figure 2 is a cross-sectional view of apparatus for carrying out the invention, the section being taken axially therethrough;

Figure 3 is a view partly in end elevation and partly in transverse cross-section, the section being taken on the line III—III of Figure 2;

Figure 4 is a transverse cross-sectional view taken on the line IV—IV of Figure 2;

Figure 5 is a diagram indicating the manner in which the gas flows through the apparatus; and Figure 6 is a diagram showing how the heated thermoconductive substance is conducted through heat transfer means to act as a heating medium.

The apparatus is generally similar to that of my said patent. Referring first to the diagram Figure 1, there is shown in such figure a bent tube $abcdef$ provided with bearings B on $ab$ and $ef$, the tube intermediate the bearings being of generally U form at $bcde$. Let it be assumed that the tube may be rotated very rapidly in the bearings B. Let a moderate flow of air be introduced at $a$. As the air passes along $bc$ outwardly from the axis $ab$—$ef$ it will be subjected to a centrifugal force toward $c$ which compresses the air along $bc$ and in $cd$ to a pressure above that in $ab$ and raises its temperature. As this compressed warmer air moves back toward the axis along $be$ it is progressively relieved of the centrifugal force and expands back to its former pressure and temperature by the time it enters *ef*.

Now put in *bc* and, if needed, somewhat into *cd* a coil of pipe supplied with a thermoconductive substance by inlet and exit tubes along *ab* and which is circulated through the coil. As the gas is compressed along *bc* at least a portion of the heat of compression will be absorbed by the thermoconductive substance and carried away. Assume that sufficient heat is extracted from the gas by the thermoconductive substance to maintain the temperature of the gas during compression substantially constant. The thermoconductive substance will have removed from the gas substantially all of the heat of compression. If the coil is only at the outer part of *bc* the gas will heat up considerably during the initial stage of compression, after which the heat of compression will be conducted away by the thermoconductive substance. The extent to which the gas will be heated before being brought into thermoconductive relationship with the thermoconductive substance may be determined by the spacing of the inside of the coil from the axis of rotation.

The complete theory of action of the apparatus of my said patent is explained therein. The apparatus may be employed as a refrigerator or as both a heater and refrigerator. Since the present invention is concerned only with heating I shall not here dwell upon the theory of operation whereby my invention is adapted for refrigeration.

In Figures 2, 3 and 4 of the drawings I have shown more or less diagrammatically one form of apparatus which I term a rotor-heater. There is provided a heavy stationary sectional metal casing 2. This casing is formed to provide a generally cylindrical chamber 3 within which a rotor designated generally by reference numeral 4 is adapted to be rotated at high speed. The rotor is contained within a jacket 5 which is of generally cylindrical shape with axial trunnion-like hollow projections 6 at its opposite ends. These trunnion-like projections 6 are disposed within bearing portions 7 of the casing 2. The jacket 5 is made of exceptionally strong material, as, for example, chrome-nickel steel, and is adapted to rotate with moderate clearance in the casing 2. The casing 2 allows the rotor to be run in a vacuum and serves as a guard against flying parts in the event of failure.

There are provided two coaxial pipes, an inner pipe 8 and an outer pipe 9, which extend into the rotor axially from one end thereof. The thermoconductive substance is adapted to enter through the pipe 8 and to leave outside the pipe 8 but within pipe 9. The casing 2 has an extension 10 provided with a connection 11 to the pipe 8 and a connection 12 to the pipe 9. The pipe 8 passes axially into the jacket 5 and extends therethrough for the greater portion of the length of the jacket. Mounted in the jacket and extending transversely of the axis of the rotor is a baffle 13. The baffle may be attached to the jacket 5 by brackets (not shown) fastened to the interior of the jacket and to the baffle. The baffle is preferably imperforate and of circular shape with its periphery spaced somewhat from the inner peripheral surface of the jacket as shown in Figure 2. The pipe 8 extends through the jacket 5 to a point immediately in front of the baffle 13 where it enters an inlet manifold 14. The manifold comprises a central hub or connecting portion into which the pipe 8 extends and a plurality, for example eight, of radially outwardly extending pipes 15. The pipes 15 are equally spaced circumferentially of the manifold. Each of the pipes 15 extends straight out parallel to the baffle 13 substantially to the periphery of the baffle where it merges into a coil 16 which extends about the axis of the rotor and also progresses longitudinally of such axis from top to bottom viewing Figure 2. Thus there are actually as many individual coils as pipes 15 extending spirally within the jacket 5 and interfitting with one another.

Disposed within the jacket 5 and suitably supported therein, as, for example, by brackets connected with the jacket and by spacers, is a plurality of coaxial perforate metal cylinders. In Figures 2 and 3 these cylinders are designated respectively by reference numerals 21 to 26, inclusive, starting with the inside cylinder and progressing outwardly. The perforations in the cylinders are preferably narrow slots running circumferentially for short angular distances and are staggered as shown in Figure 2. They serve as baffles for directing the gas flow in contact with the coils and they also assist in positioning and spacing the coils. The outer wrap of each coil is wound about the cylinder 26 from top to bottom viewing Figure 2. Adjacent the bottom of the jacket 5 each coil then passes inwardly and is wrapped from bottom to top, viewing Figure 2, about the cylinder 25 and within the cylinder 26. Thus the coils progress gradually back and forth along the axis of the jacket 5 and also toward such axis. Each of the coils enters an outlet manifold 27 similar to the inlet manifold 15 except that provision is made for passage through the manifold 27 of the pipe 8. Connected with the manifold 27 to receive the outflowing thermoconductive substance and also disposed about the pipe 8 as above described is the pipe 9. Thus the thermoconductive substance enters through the connection 11, passes upwardly viewing Figure 2 through the pipe 8 to the manifold 14, thence through the pipes 15 and the coils 16 and into the manifold 27 and out through the pipe 9 and the connection 12.

The inside of the coil is spaced substantially from the axis of rotation of the rotor, which is coaxial with the pipes 8 and 9. This is for the purpose as mentioned above and as will further appear below of permitting the flowing gas to be compressed adiabatically before heat is extracted therefrom by the thermoconductive substance in the coil.

The casing 2 is provided with a gas inlet 28 communicating with the interior of the lower projection 6 of the jacket 5 viewing Figure 2. Gas enters through the inlet 28 and the lower hollow projection 6 and thence passes outwardly, first through the space between the exterior of the pipe 9 and the interior of the coil 16 and thence outwardly among the convolutions of the coil through the perforations in the cylinders 21 to 26, inclusive. The diagram Figure 5 indicates how the gas flows outwardly through the perforations in the cylinders 21 to 26, inclusive, and among the convolutions of the coil. Figure 3 is partly in cross-section on the line III—III of Figure 2 and does not show clearly the path of the gas because of the fact that the coils are inclined to the axis of the rotor. Radial septa 33 which extend longitudinally of the axis of the rotor are provided to assist in distributing gas circumferentially of the rotor and insure that the gas will always move around with the same angular speed as the rotor. Four such septa are preferably employed, although the number may be increased or decreased. The gas finally passes through all of the cylinders and reaches the inner peripheral surface of the jacket 5 whence it passes along such surface upwardly viewing Figure 2 past the edge of the baffle 13 and thence inwardly toward the axis of the rotor through a passage 29 within which are four radial septa 34 and out axially of the rotor and upwardly viewing Figure 2 through the upper hollow projection 6 of the jacket 5. During such passage the gas expands and cools and the relatively cold gas passing out through the upper hollow projection 6 may be used for refrigeration in any well known manner. The expansion of the gas unless controlled so as to be otherwise will be substantially adiabatic.

A means for driving the rotor is shown diagrammatically in Figure 2. The casing 2 has a cylindrical portion 30 which may be the casing of a high frequency induction motor, the field magnets of the stator of which are shown at 31 and the squirrel cage rotor of which is shown at 32. The motor is supplied with alternating current of sufficient frequency to drive it at high speed. The rotor 32 of the motor is fastened directly to the pipe 9 and upon operation of the motor the pipe 9 is turned thereby. Thus the pipe 9 serves as the driving shaft for the rotor 4. No attempt has been made to show structural details which may be employed to fasten together the various parts and provide sufficient strength to enable the device to operate satisfactorily at high speeds. If constructed as shown in the drawings the device will operate as described and in actual quantity production the parts will be designed and assembled in accordance with good engineering practice.

Instead of employing an induction motor for driving the rotor any other suitable driving means may be employed, as, for example, a synchronous single or multiple phase motor driven by high frequency alternating current or a de Laval type air or steam turbine.

As the gas moves outwardly within the rotor it is guided by the perforate cylinders and septa so as to flow parallel to the coils in each layer for short angular distances before advancing to the next outer layer. If these angular distances be kept alike the linear distances through which the gas moves increase with the radius. Since the work done in compressing the gas along the radius increases proportionately with the radius the heat to be transferred per unit area of tube remains the same. Since the gas density increases with radius the gas velocity past the adjacent metal parts decreases in successive layers toward the periphery. Moreover, the huge artificial gravity field greatly exaggerates convective movement in the gas. Thus any small mass of gas cooled by contact with the coils becomes thereby denser than its neighboring gas and moves violently outwardly. The cooling surfaces of the coils are thus swept by movement of the surface gas layer and the heat exchange is greatly accelerated. Thus both the mass contact of the gas and its convective movement combine to make the heat exchange very effective.

Figure 6 is a flow diagram showing how my rotor-heater is employed in a heating system for houses and other buildings. The rotor 4' has an inlet 11' and an outlet 12' for the thermoconductive substance, as, for example, water. The heated thermoconductive substance passes through a heater or series of heaters designated generally by reference numeral 35. This may be a radiator or a plurality of radiators of any preferred form. The gas enters the rotor at 28', being introduced under pressure created by a compressor 40, and leaves at 36, passing through a heat exchanger 37 wherein its temperature is raised, as by its being passed in thermoconductive relationship with a warmer medium. The gas employed in the rotor may, for example, be air which when it passes to the heat exchanger 37 is at a temperature much lower than atmospheric (outdoor) temperature. It may be warmed in the heat exchanger by being passed in thermoconductive relationship with air at atmospheric temperature which may enter the heat exchanger at 38 and leave it at 39. A relatively large quantity of air at atmospheric temperature may be employed as the supply is unlimited and it costs nothing. The warmed gas completes the cycle through the compressor 40 and the pipe 28'.

Thus it is possible by use of my process and apparatus and with only water and air as the thermoconductive substance and the gas, respectively, to provide a practical and economical heating system. The heat exchanger 37 of Figure 6 may be replaced by a refrigeration unit if desired so that a combination heating and refrigeration system may be provided.

The efficiency of my method and apparatus may be increased if the temperature to which the gas is expanded following compression in the gas cycle is limited to a temperature only slightly lower than atmospheric (outdoor) temperature. This may be accomplished with the apparatus disclosed by providing a heating medium in contact with the expanding gas in the passage 29 (wherein the gas expands as it passes toward the axis of the rotor) at the portion of such passage adjacent the axis of the rotor. The heating medium may be introduced through the gas outlet 6 at the top of Figure 2, circulated in a coil disposed at the inner part of the passage 29 and led out also through the gas outlet 6. The arrangement of the inlet and outlet may be similar to the arrangement of the fluid inlet and outlet; i. e., concentric conduits may be provided within the gas outlet 6 communicating with opposite ends of the coil in the passage 29. The coil should extend radially outwardly only part way to the periphery of the jacket 5, the radial extent of the coil being determined by the desired exit temperature of the gas and the temperature of the heating medium. The heating medium should be circulated by a pump. Preferably a liquid will be used as the heating medium, as, for example, water. This provision will result in the expansion of the gas as it moves toward the axis of the rotor changing from adiabatic to nearly isothermal expansion. During the latter part of the expansion the density of the gas decreases more than during adiabatic expansion so less initial pressure will be required to move the gas through the latter part of the expansion.

While I have shown and described certain present preferred embodiments of the invention and certain present preferred methods of practicing the same it is to be distinctly understood that the invention is not limited thereto but may be otherwise variously embodied and practiced within the scope of the following claims.

I claim:

1. A heating process comprising subjecting a flowing gas to centrifugal action in a rotating enclosure and thereby compressing and heating the gas, passing a thermoconductive substance in thermoconductive relationship with the gas simultaneously with said compressing after the gas has been heated to a desired extent and by the thermoconductive substance abstracting heat from the heated gas and conducting the thermoconductive substance through heat transfer means whereby the thermoconductive substance acts as a heating medium.

2. A heating process comprising subjecting a flowing gas to centrifugal action in a rotating enclosure and thereby adiabatically compressing the gas, with attendant rise in temperature of the gas, passing a thermoconductive substance in thermoconductive relationship with the heated gas while continuing compressing of the gas and by the thermoconductive substance abstracting heat from the heated gas and conducting the thermoconductive substance through heat transfer means whereby the thermoconductive substance acts as a heating medium.

3. Heating apparatus comprising a rotor, means for rotating the rotor, means for guiding a flowing gas generally axially into the rotor during rotation of the rotor, thence generally away from the axis of the rotor, thereafter generally toward the axis of the rotor and thence generally axially out of the rotor at the end of the rotor opposite that at which the gas entered, means rotating with the rotor for guiding a flowing thermoconductive substance generally axially into the rotor during rotation of the rotor and while within the rotor in thermoconductive relationship with the flowing gas only while the flowing gas is disposed substantially away from the axis of the rotor and thence generally axially out of the rotor at the same end thereof as that at which the thermoconductive substance entered the rotor and heat transfer means to which the thermoconductive substance is conducted and wherein the thermoconductive substance acts as a heating medium.

4. Heating apparatus comprising a rotor, a baffle within the rotor extending transversely of the axis thereof, means for guiding a gas generally axially into the rotor, around the edge of the baffle and thence generally axially out of the rotor at the end thereof opposite the end at which the gas entered, cooling means containing a thermoconductive substance with which the gas is adapted to contact within the rotor at the side of the baffle facing toward the end of the rotor at which the gas entered and only while the gas is spaced substantially away from the axis of the rotor and heat transfer means to which the thermoconductive substance is conducted and wherein the thermoconductive substance acts as a heating medium.

5. Heating apparatus comprising a rotatable enclosure, a conduit within the enclosure rotating therewith and having an inlet and an outlet extending from the enclosure generally along its axis so that a thermoconductive substance can be circulated in the conduit during rotation of the enclosure, means for guiding a flowing gas into, within and out of the enclosure during rotation of the enclosure and while within the enclosure and only while substantially spaced from the axis thereof in thermoconductive relationship with said conduit, means for rotating the enclosure at such very high speed as to substantially compress the gas by centrifugal action and heat transfer means to which the thermoconductive substance is conducted and wherein the thermoconductive substance acts as a heating medium.

6. A heating process comprising circulating a thermoconductive substance in a sinuous conduit disposed within and rotating with a rapidly rotating rotor and simultaneously flowing a gas through the rotor while first guiding the gas generally away from the axis of the rotor in thermoconductive relationship with the outside of the sinuous conduit only at portions thereof substantially removed from the axis of the rotor, thereafter guiding the gas back toward the axis of the rotor while out of thermoconductive relationship with the outside of the sinuous conduit and conducting the thermoconductive substance through heat transfer means whereby the thermoconductive substance acts as a heating medium.

7. A heating process comprising subjecting a gas flow to centrifugal forces while (1) guiding the flow generally radially away from the axis of revolution, during which the radially increasing centrifugal force substantially compresses the gas, tending to heat it, and (2) guiding the flow radially toward the axis of revolution, during which the radially decreasing centrifugal force allows the gas to expand, tending to cool it, conducting a liquid flow to absorb heat of compression in thermoconductive relationship but out of contact with the gas flow during that part only of the compressional movement of the gas away from the axis when the gas is substantially spaced from the axis and conducting the liquid flow through heat transfer means whereby the liquid flow acts as a heating medium.

8. A heating process comprising subjecting a flowing gas to centrifugal action in a rotating enclosure and thereby compressing the gas, simultaneously with said compressing passing a thermoconductive substance in thermoconductive relationship with the gas and by the thermoconductive substance abstracting heat from the gas, removing the gas from thermoconductive relationship with the thermoconductive substance, after such removal of the gas expanding and thereby cooling the gas, limiting the temperature to which the gas is thus cooled by conducting a heating medium in thermoconductive relationship with the expanding gas and conducting the thermoconductive substance through heat transfer means whereby the thermoconductive substance acts as a heating medium.

JOHN R. ROEBUCK.

REFERENCES CITED

The following references are of record in the file of this patent:

UNITED STATES PATENTS

| Number | Name | Date |
| --- | --- | --- |
| 932,711 | Knight et al. | Aug. 31, 1909 |
| 1,906,370 | Darrow | May 2, 1933 |
| 2,393,338 | Roebuck | Jan. 22, 1946 |